April 1, 1930. G. A. KOHOUT 1,752,801
POWER FEED STOKER
Filed Aug. 28, 1924 6 Sheets-Sheet 1

April 1, 1930.   G. A. KOHOUT   1,752,801
POWER FEED STOKER
Filed Aug. 28, 1924    6 Sheets-Sheet 2

Inventor:
George A. Kohout,

April 1, 1930.   G. A. KOHOUT   1,752,801
POWER FEED STOKER
Filed Aug. 28, 1924   6 Sheets-Sheet 4

Inventor:
George A. Kohout,

April 1, 1930.  G. A. KOHOUT  1,752,801
POWER FEED STOKER
Filed Aug. 28, 1924  6 Sheets-Sheet 5

Inventor:
George A. Kohout,
by May W Zabel
Atty.

UNITED STATES PATENT OFFICE

GEORGE A. KOHOUT, OF CHICAGO, ILLINOIS

POWER FEED STOKER

Application filed August 28, 1924. Serial No. 734,731.

My invention relates to stokers, and more particularly to a power operated hopper feed stoker.

It is a purpose of my invention to provide a power feed stoker that may also be operated by hand if desired and preferably the stoker comprises a plurality of feeding units, each of which may be operated independently of the others.

It is more particularly a purpose of my invention to provide a stoker comprising a plurality of pusher members, each of which is reciprocable to feed fuel into a furnace with power driven means for reciprocating the same and with means for operating the same by hand, said pusher means being operable either by power or by hand as desired and being operable independently of each other, that is, any one of the pusher members may be operated by hand independently of the power drive for the other members or any one of the power driven members may be operated whether the other power driven members are in operation or not.

It is still a further purpose of the invention to provide means whereby any obstruction in the path of one of the power driven pusher members will not have any effect on any of the other power driven pusher members, nor on the power driven operating means for said pusher members.

More particularly, it is a purpose of my invention to provide means for feeding fuel to furnaces from hoppers comprising pusher blocks operable below the open bottom of the hopper and toward and away from the opening into the furnace to thus accelerate the movement of fuel from the hopper to the furnace through the furnace opening and to provide driving means for reciprocating said pusher blocks comprising a rotatable shaft having cams or eccentrics thereon that are adapted to co-operate with levers comprising portions extending on both sides of said cams or eccentrics or embracing the same whereby the rotation of the shaft causes said portions to be rocked or oscillated thereby reciprocating the blocks.

It is a further object of my invention to provide for relative movement between said cam embracing portions and to provide means for yieldingly connecting said portions together, one of said lever portions being connected to positively move the reciprocating pusher block associated therewith in one direction and the other of said lever portions being connected therewith through yielding means to move the pusher block in the opposite direction.

It is a further purpose of the invention to provide means for adjusting the stroke of the reciprocable member due to the action of the power driven means, said adjusting means comprising an adjustable stop member for adjusting the normal separation of the cam engaging portions of the rockable member, the tension of the springs acting normally to hold the parts at such a spacing as is determined by said adjustable stop member.

It is a further purpose of the invention to provide a positive, fixed stop means for limiting the movement of the two cam or eccentric engaging portions of the forked member toward each other so as to make it impossible to adjust the device so that both portions of the member will be in engagement with opposite sides of its cam or eccentric, thus avoiding the spring pressure over a large portion of the surface of said eccentrics or cams and avoiding unusual strain on the driving mechanism due to said friction.

It is still a further purpose of the invention to provide a fuel feeding device comprising pusher blocks that are adapted to feed fuel from a hopper to a furnace by reciprocation of the blocks below the open bottom of the hopper toward and away from the furnace opening with means for adjusting the range of movement of the pusher blocks so as to determine the ends of the stroke thereof whereby the size of the fuel feeding opening from the hopper may be regulated by adjusting said blocks.

It is a further purpose of the invention to provide means for detachably connecting the above mentioned rockable members so that the pusher blocks can be operated by hand independently of the power driven means when desired. When said pusher blocks are operated by hand, the same may be moved to a position to close the furnace opening and thus prevent burning back of the fire into the hopper, this being done when the fires are banked. It is another purpose of the invention to provide means for operating reciprocable pusher blocks so that the same will always remain in line even if the load on one side of the block is greater than on the other, that is, assuming that a lump of coal would be at one side of the pusher block from the center line thereof making the resistance against the pushing of the block greater on that side of the block than on the other side thereof, the means provided will prevent the blocks from being pushed out of line due to this condition.

It is still another object of the invention to provide the jaw or eccentric engaging faces of the arms co-operating with said eccentrics with hardened surfaces and to further provide anti-friction means on the cams or eccentrics.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
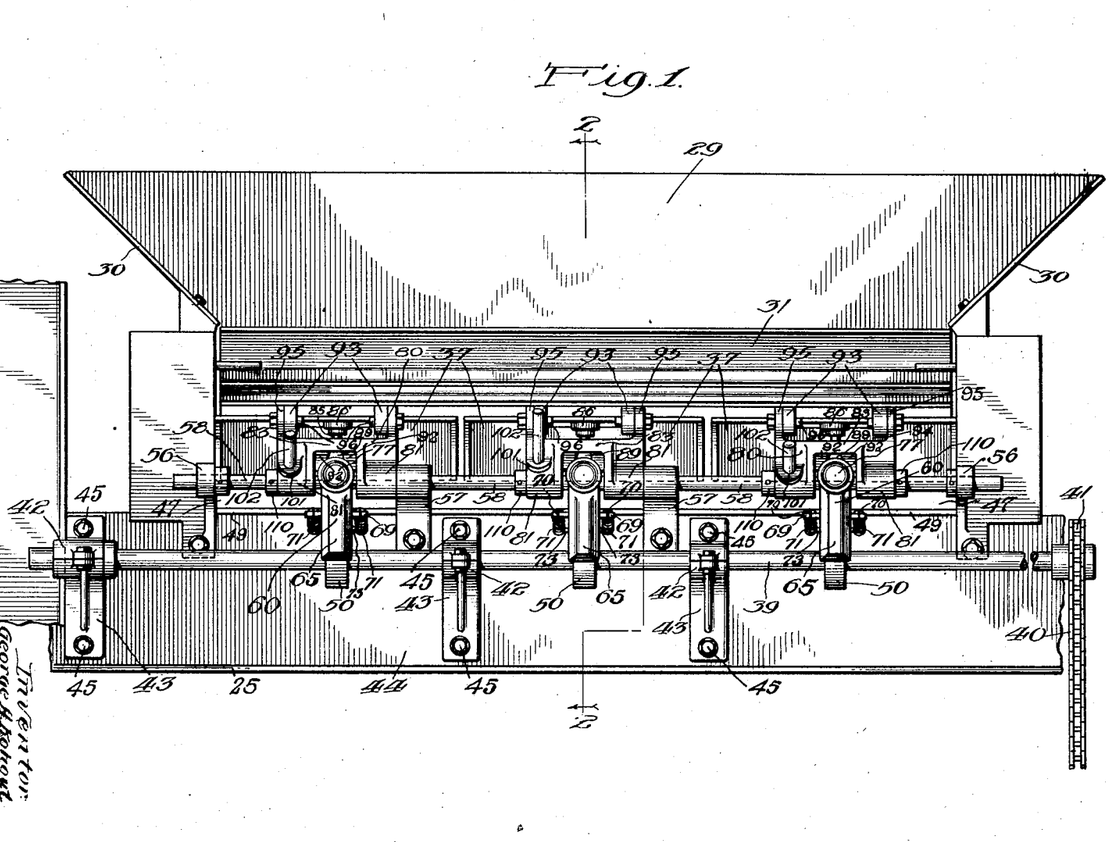
Fig. 1 is a fragmentary view in front elevation of a furnace showing my improved fuel feeding mechanism applied thereto.
Figures 2, 3:
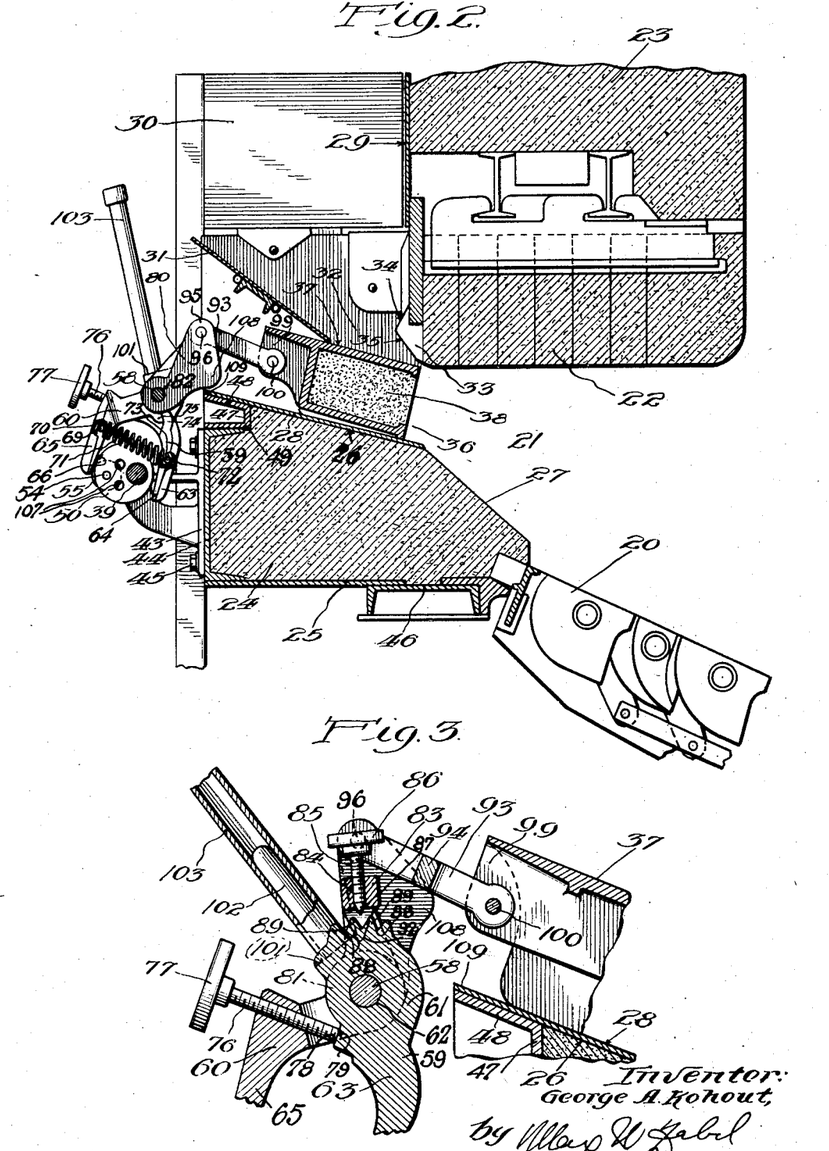
Fig. 2 is a fragmentary longitudinal sectional view taken on the line 2—2 of Fig. 1.
Fig. 3 is a fragmentary section showing the device adjusted for manual operation, said section being taken on a line corresponding to the line 3—3 of Fig. 4, showing a modified form of pusher block.

Referring in detail to the drawings, in Fig. 2 is shown a furnace provided with a stoker grate 20 which is operated in any suitable manner and to which the fuel is being fed. The stoker grate is mounted in a furnace 21 provided with an arch 22 which is shown as being of a flat type but which may be of any desired construction and which has a front wall portion 23 extending above said arch. The furnace is further provided with a wall portion 24 of refractory material which is mounted on a suitable metallic framework 25 and which is provided with an upper inclined portion 26 which merges with a more sharply inclined portion 27 leading to the stoker grate 20. Mounted on the inclined surface 26 is a metal plate 28 forming a shelf-like portion and above said shelf-like portion is provided a fuel hopper 29, which it will be clear from Fig. 1, is provided with inclined side wall portions 30 and with an inclined bottom 31.

The bottom 31 terminates at a spaced distance from the inclined shelf-like portion 28 and at a spaced distance from the arch 22, thus providing a fuel feeding opening 32 in the bottom of the hopper between the block 33 of refractory material at the forward end of the arch 22 which is provided with an inclined face 34 forming a portion of the bottom of the hopper and with an undercut inclined face 35 to provide for the more ready passage of the fuel through the opening 32 toward the fire box of the furnace 21. The member 33, the arch 22 and the member 24 define an opening 36 forming the fuel feeding opening into the furnace. Operating upon the shelf-like portion 28 are pusher blocks 37 which are provided with a filler 38 of refractory material. Said pusher blocks are so proportioned that the same will pass between the lower edge of the inclined bottom 31 of the hopper and the inclined shelf 28 and will be movable into a position to completely close the opening 36, simultaneously also closing the opening 32.

Suitable means is provided for reciprocating the pusher blocks 37 or 137 so as to accelerate the feeding of the fuel from the hopper 29 to the furnace 21 through the opening 36.

It will be obvious from Fig. 2 that if the pusher blocks are retracted so as to leave the openings 32 and 36 open, fuel will pass by gravity from the hopper into the furnace, but if it is desired to accelerate the feeding of the fuel or to aid the feeding of the fuel by means of the pusher blocks, the pusher blocks are reciprocated which will force the fuel that is positioned on the shelf 28 in the front of said pusher blocks into the furnace, thus pushing all of the fuel before it that may be situated in a pile adjacent the opening 36 onto the stoker grate 20.

The operating means for the pusher blocks comprises power operated means and hand operated means. The hand operated means forms a portion of the power operated means and may be separated from the power operated means to operate the device by hand when desired. The power operated means comprises a rotating shaft 39 which is rotated by means of a sprocket chain 40 operating over a sprocket wheel 41, said sprocket chain 40 being driven by any suitable source of power. Preferably, the sprocket chain 40 is driven from an electric motor through a reduction gearing to obtain a relatively slow rotation of the shaft 39 with the use of a small amount of power. The shaft 39 is mounted in bearings 42 provided on the brackets 43 secured to the channel 44 in any suitable manner as by means of the bolts 45. The channel 44 forms a part of the front of the furnace and is mounted between the plate 25 which is mounted on a channel 46 and the channeled supporting member 47 for the forward end of the plate 28, said supporting member 47 being provided with an inclined flange 48 and a horizontal flange 49 resting on one of the flanges of the channel 44, the channel 44 being supported at opposite ends thereof by the masonry of the furnace as is well-known.

Mounted on the shaft 39 are the eccentric or cam members 50. The members 50 are eccentrically mounted on the shaft 39 as will be clear from Fig. 5 and are held in fixed position thereon so as to rotate therewith by means of the set screws 51, the heads of which are seated in recesses 52 in the members 50. Each of the members 50 is provided with a central recess or opening 53 extending inwardly from the curved face thereof and a shaft 54 extends across each of said recesses, said shaft having a roller 55 mounted thereon, said roller being preferably hardened and being free to turn on the shaft 54. The number of eccentrics or cams 50 corresponds to the number of pusher blocks provided in the particular installation of which the mechanism forms a part.

Figure 10:
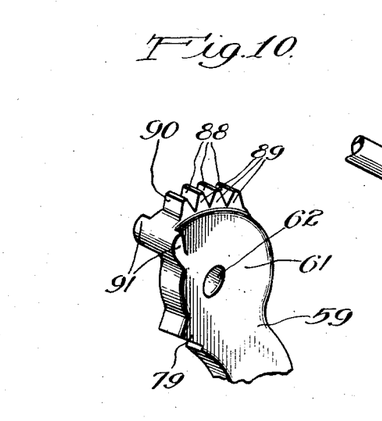
Fig. 10 is a similar view of a fragment of one of the arms of the forked member.

Mounted in suitable bearings 56 and 57 which are secured to the channel 44 in any suitable manner is the shaft 58. Upon the shaft 58 are mounted a plurality of rockable members each made up of a pair of relatively movable arms 59 and 60. The member 59 is shown more in detail in Fig. 10 and comprises an upper enlarged head portion 61 having an opening 62 therein through which the shaft 58 extends, the member 59 being freely rotatable on said shaft. Said member 59 is provided with a dependent curved finger 63 which is adapted to lie on one side of the eccentric or cam member 50, the face 64 of said member 59 adjacent the cam or eccentric with which said cam or eccentric engages being hardened so as to reduce the wear thereof. The members 60 are provided with similar dependent fingers 65 which lie on the opposite side of the cams 50 and are provided with hardened inner faces 66 with which the cams engage. Said fingers 63 and 65 thus form a pair of jaws cooperating with the cam 50. Each of the members 60 is provided with bifurcated portion providing a pair of ears 67 lying on opposite sides of the enlarged upper portion 61 of a member 59 and each having openings 68 for receiving the shaft 58, said members 59 and 60 being both freely swingable on the shaft 58.

Each of the members 60 is provided with a transversely extending steel rod 69 cast into the same, said rod projecting on opposite sides of the member 60 and being adapted to receive the eyes 70 provided on the ends of the springs 71. The opposite ends of the springs 71 are provided with eyes or loops 72 which extend over the ends of the rod 73 which is similarly cast in the member 59 associated with said member 60. The springs 71 draw the members 59 and 60 toward each other so as to tend to close the jaws 63 and 65 of the same causing said jaws to engage with the eccentrics 50. The member 59 of each pair is provided with a stop 74 which is adapted to cooperate with the stop 75 on the member 60 to limit the closing movement of the members 59 and 60 so that the portions 63 and 65 thereof will be spaced slightly further apart than the diameters of the eccentrics 50. Thus, each eccentric will be engaging with only one of said members at one time.

Figure 5:
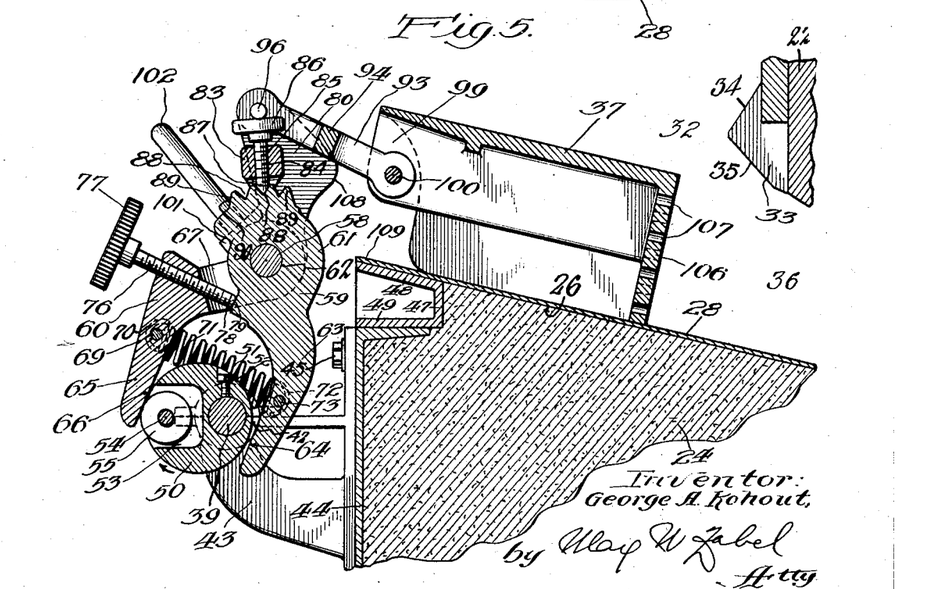
Fig. 5 is a section taken on the line 5—5 of Fig. 4.
Figure 6:
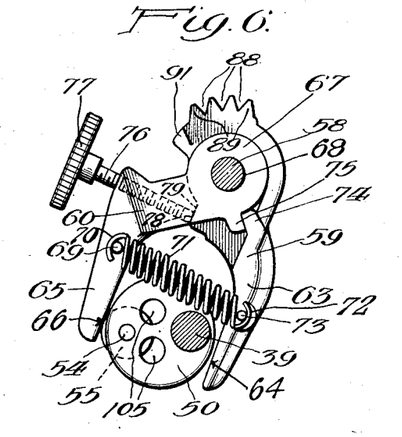
Fig. 6 is an enlarged detailed view partly in elevation and partly in section of a portion of the operating means showing the forked member adjusted so as to make the stroke of the pusher block as great as possible.
Figure 7:
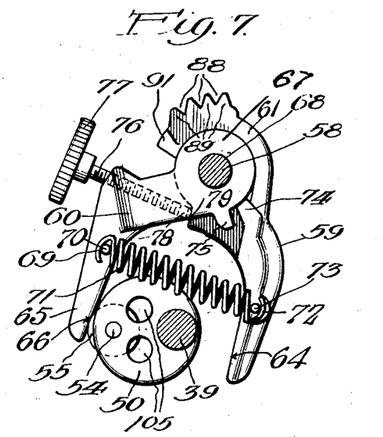
Fig. 7 is a similar view showing the parts adjusted to produce a smaller stroke of the pusher block.

Mounted in the member 60 is a screw-threaded adjusting member 76 which is provided with an enlarged head 77 for rotating the same, said member being mounted in a suitable screw-threaded opening in said member 60 so that the rotation thereof will project the same toward the member 59 or away from the same, depending on the direction in which the member 76 is rotated. The end portion 78 of the member 76 projects between the bifurcations 67 of the member 60 and engages with a shoulder 79 on the member 59. It will be evident that by adjusting the member 76, the amount that the springs 71 will close the jaws formed by the members 59 and 60 can be adjusted. It will also be evident that the amount of swinging or rocking of the members 59 and 60 will depend upon the spacing between the fingers or jaws 63 and 65 of said members on opposite sides of the eccentrics 50. Thus, if the parts are adjusted as shown in Figs. 5 and 6, which show the adjustment of the screw 76 such that the members 74 and 75 will come into engagement due to the action of the springs 71, the members 59 and 60 will have the maximum rocking movement due to the action of the cams 50 associated therewith. When the parts are adjusted as shown in Fig. 7 with the stops 74 and 75 out of engagement, the rocking movement of the members 59 and 60 due to the action of the cams 50 associated therewith will be less than that for the adjustment shown in Figs. 5 and 6.

Figure 9:
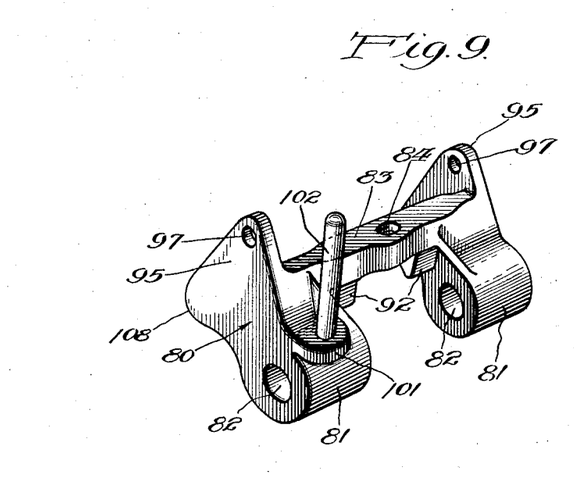
Fig. 9 is a perspective view of the rockable yoke connected with the pusher block.
Figure 11:
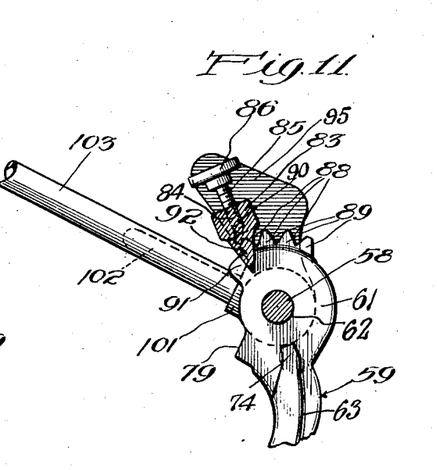
Fig. 11 is a fragmentary view partly in section and partly in elevation of the members shown in Figs. 9 and 10 in co-operating relation showing the stops for limiting the adjustment of the adjustable connection between said members.

The shaft 58 also has freely rotatively mounted thereon yoke members 80, one of which is shown alone in Fig. 9. Each yoke member 80 is provided with a pair of bearing portions 81 having openings 82 for receiving the shaft 58 and is provided with a cross bar 83 connecting the bearing portions 81, the cross bar 83 having an opening 84 therein that screw-threadedly receives the screw-threaded adjusting member 85 having a head 86 for turning the same. The end portion 87 of the member 85 is adapted to engage in the grooves or notches 88 provided between the ribs or teeth 89 on the member 59 associated therewith and it will thus be seen that the angularity of the member 80 relative to the member 59 can be adjusted by turning the screw 85 into any desired one of the notches or grooves 88. In order to prevent the adjustment of the member 80 into such a position that the screw 85 would be located on the forward side of the face 90 of foremost tooth 89, stop lugs 91 are provided on the member 59 which are adapted to cooperate with a pair of depending stop lugs 92 provided on the member 83 as will be clear from Fig. 11. When the lugs 91 and 92 are in engagement, it will be seen from Fig. 11 that it is impossible to move the screw 85 in front of the last tooth 89 as the same cannot be moved past the outer edge of the tooth 89 when the stop lugs are in engagement.

Figure 4:
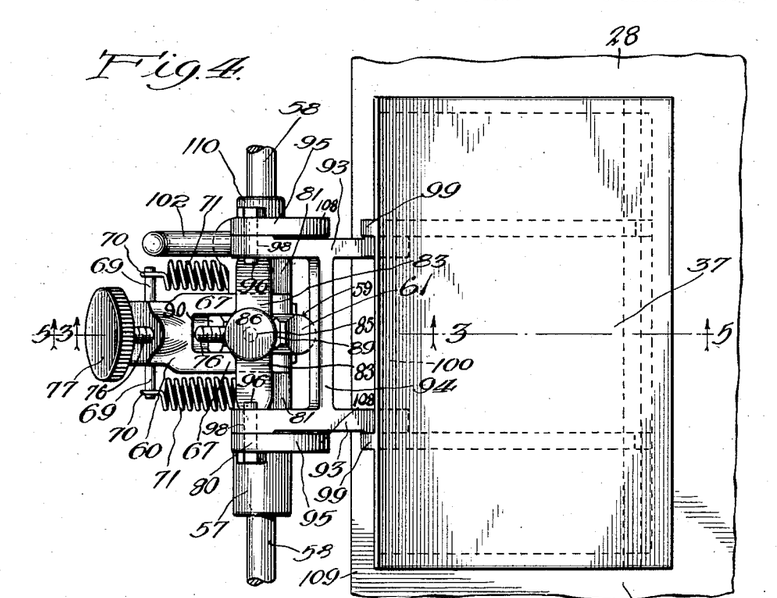
Fig. 4 is a fragmentary top plan view of one of the modified pusher blocks and the operating means therefor, corresponding to the operating means in Figs. 1 and 2 and showing a portion of the shelf-like member upon which the pusher block operates.

This arrangement is of importance, as the adjustment of the member 80 too far counter-clockwise on the shaft 58 relative to the member 59 would cause damage or breaking of certain parts of the device due to the action of the cams 50 in rocking the member 59 so as to move the member 80 counter-clockwise on said shaft 58. This will be evident upon reference to Figs. 4, 5 and 9 in which the links 93 provided with a cross bar 94 connecting the same are shown as being pivotally connected with the ears 95 provided on the members 80 by means of the pivot members 96 extending through the openings 97 in the ears 95 and through openings 98 in the members 93. The link members 93 are further connected with the ears 99 provided on opposite sides of the center line of the pusher blocks 37 by means of the pivot pins 100. It will be evident upon reference to Fig. 5 that if the member 80 is swung too far counter-clockwise relative to the member 59, the links 93 will engage with the cross bar 83 causing either a breakage of parts of the moving mechanism or causing damage to the hopper or other parts adjoining the pusher blocks due to an upward tilting of said pusher blocks.

The member 80 is provided with an enlargement or boss 101 from which a rod or pin 102 projects upwardly which is adapted to receive a piece of pipe or other tubular member 103 serving as a handle for rocking the member 80 and thus reciprocating the pusher blocks 37 by hand. This is done by moving the member 85 into a position out of engagement with the notches 88 which is the position thereof shown in Fig. 3 and in Fig. 11. When the member 85 is in this position, it will be clear that the member 80 is disconnected from the member 59 and can be rocked or oscillated above the shaft 58 independently of the power drive mechanism, of which the member 59 is a part. Upon reference to Fig. 1, it will also be evident that any one of the pusher blocks can be actuated by hand at any time desired, altho the power drive may be otherwise actuating the others of said pusher blocks by merely adjusting the screw 85 so as to release the particular yoke 80 connected with the particular block 37 or 137 that it is desired to operate by hand from the power driven mechanism associated therewith.

Figure 8:
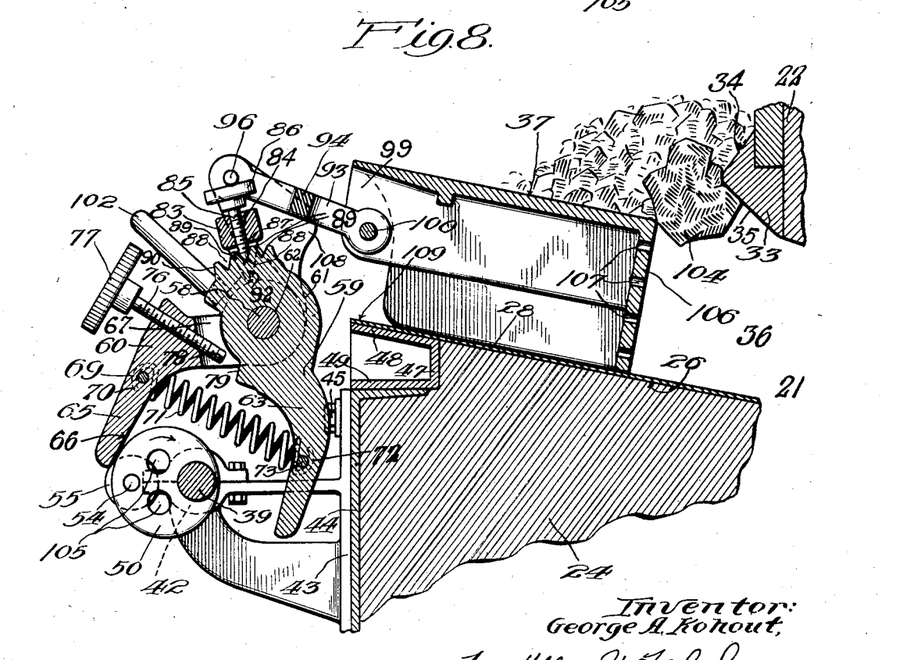
Fig. 8 is a fragmentary view in longitudinal section showing the jaws of the forked member separated due to yielding of the spring between the same when the pusher block engages with an obstacle such as a piece of slate or other hard material, the modified form of pusher block shown in Fig. 5 being shown therein.

When the power driven mechanism is operating the pusher blocks, the cams or eccentrics 50 which rotate in the direction indicated by the arrows in Figs. 5 and 8 engage with the members 60 and 59 alternatingly to move the pusher blocks in a direction to feed fuel into the furnace and in the opposite direction respectively. It will be seen that the length of the stroke of the pusher blocks can be adjusted by means of the adjusting screws 76 by varying the angular movement of the members 59 and 60 due to the action of the cams or eccentrics 50. It will also be seen that by providing the adjusting means of the angularity between the members 80 and 59, the position of the pusher blocks at the beginning and the ending of the stroke can be adjusted. Thus, the amount of opening provided in the bottom of the hopper can be adjusted by adjusting the screws 85 as the amount of fuel fed through the opening will be dependent upon the distance that the pusher blocks 37 are retracted at each reciprocation thereof. Thus, if the screw 85 is moved into the notch 88, the farthest to the left in Fig. 5, the opening will be the greatest and the movement of the pusher blocks will be within the range that does not extend up to a point where the opening 36 is completely closed by reciprocation of the block at the extreme forward end of its movement. While if the screw is placed in the next adjoining notch 88, the amount of opening with each reciprocation of the block in the bottom of the hopper will be decreased and the block will move nearer to the furnace opening 36, thus, more completely closing the same and the amount of opening in the bottom of the hopper will decrease and the closing of the opening 36 will come more complete for each notch 88 that the screw 85 is moved toward the right in Fig. 5. It will also be evident due to the construction of the members 59 and 60 and the resilient connections 71 between the same, that the retractile movement of the pusher blocks will be positive due to the positive engagement of the members 59 with the members 80 but that the feeding movement or movement of the pusher blocks toward the fire box of the furnace will be yielding due to the yielding connection between the member 60 and the member 59 associated with each of the pusher blocks. The springs 71 are of such an unextended length that normally the stop 79 will be engaged by the screw 76 or the stop 75 with the stop 74 when the parts are adjusted to such a position that these stops can engage.

The springs 71 will normally not yield during the feeding movement of the pusher blocks and the amount of fuel fed or the stroke of the pusher blocks will be directly dependent upon the adjustment of the member 76 but if any obstruction, such as is shown in Fig. 8 (in which a lump of hard material, such as slate or stone indicated by the numeral 104 is shown as being wedged between the block 33 and the pusher block 137) gets in the way of a pusher block, the springs 71 will yield in the manner shown in Fig. 8. The screw 76 will then move out of engagement with the stop 79 and the jaws 65 and 63 will separate so that the cams or eccentrics 50 will rotate with the shaft 39, although the movement of the pusher block 137 is stopped by the obstruction 104. Thus, the obstruction or interference with the movement of one of the pusher blocks will not affect the operation of the other pusher blocks and will not place any undue strain on the driving mechanism, the only additional work necessary being caused by the increased friction between the member 65 and the roller 55 caused by the additional pressure of the springs 71.

The cams 50 are provided with suitable openings 105 in the sides thereof to permit the dirt to drop out of the same, thus preventing any dirt that might enter the openings 53 from remaining therein to interfere with the operation of the rollers 55.

Instead of providing the blocks 37 with the refractory lining 48 as shown in Fig. 2, the blocks may be made hollow as shown in Fig. 8 in which a front wall portion 106 is provided integral with the main body portion of the block 137, said wall being provided with ventilating openings 107 for cooling the metallic wall 106.

In order to prevent the movement of the pusher blocks in toward the furnace too far, which might cause damage to the arch or other brick work of the furnace, the members 80 are provided each with a forward projection or nose 108 on each side thereof which is adapted to engage with the forward end 109 of the plate 28 when the parts are in the position shown in Fig. 2 to limit the inward movement of the pusher blocks. This will prevent the inward movement too far by hand and also, if the adjustment of the device should permit this, the inward movement too far due to the power driven means as the engagement of the member 108 with the member 109 will cause the springs 71 to yield, thus opening the jaws and preventing further inward movement of the pusher blocks.

In order to properly space the pusher blocks 37 or 137 relative to each other and along the shaft 58, the collars 110 are provided on the shaft 58 for holding the members 80 in proper spaced relationship thereon, certain of the bearings 57 co-operating therewith as will be clear from Fig. 1. Due to the arrangement of the link members or arms 93 on opposite sides of the yokes 80 pivotally engaging with the ears 99 on opposite sides of the center line of pusher blocks, the pusher blocks will always move in a straight line and will thus always exert a straight push on the fuel and will not engage with each other due to any swinging out of line or sideward movement thereof.

Figures 12, 13:
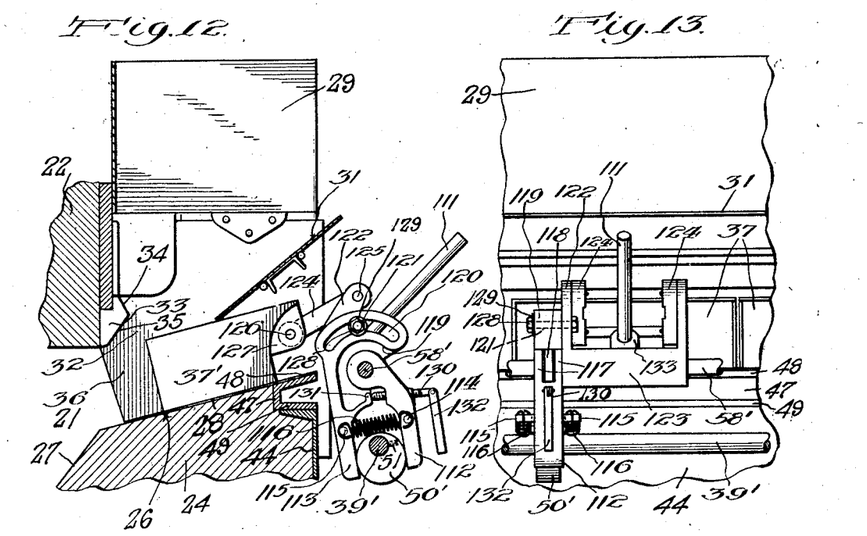
Fig. 12 is a view similar to Fig. 2 of a modified form of the invention.
Fig. 13 is a fragmentary front elevation of the device shown in Fig. 12.
Figure 14:
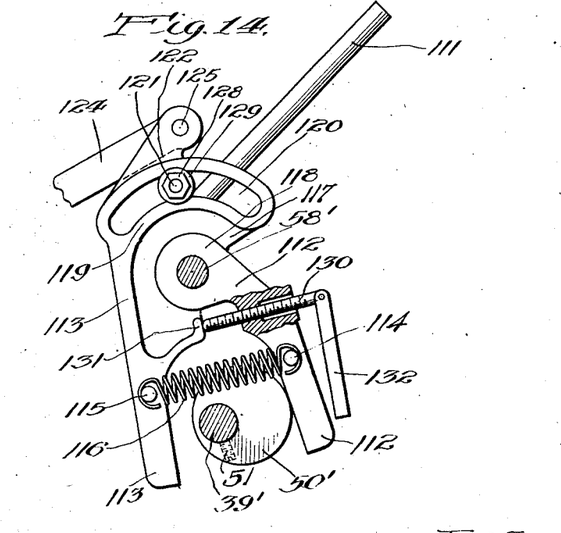
Fig. 14 is an enlarged detailed view of the mechanism shown in Fig. 12 adjusted so as to reduce the stroke of the reciprocable pusher block.

In Figs. 12, 13, and 14 is shown a different form of actuating mechanism for the pusher blocks 37' which correspond in construction to the pusher blocks 37. Said pusher blocks are either reciprocated by hand by means of the handle 111 or by means of the power driven shaft 39' having the eccentrics or cams 50' thereon corresponding to the cams 50 in Figs. 1 to 11 inclusive through suitable adjustable and yielding driving mechanism which will now be described.

The shaft 58' is provided, corresponding to the shaft 58, and upon this is mounted a pair of arms or levers 112 and 113. The levers 112 and 113 are provided with pins 114 and 115 carrying the coil springs 116 for pulling the levers toward each other, said levers being freely rotatably mounted on the shaft 58', the member 112 being provided with a pair of ears 117 through which the shaft 58' passes and between which is mounted the bearing portion 118 of the member 112. The member 113 is provided with an enlargement or elongated ear 119 at the upper end thereof which is provided with an arcuate slot 120 thru which passes a bolt 121 which is mounted in an ear 122 provided on the yoke-like member 123 which is pivotally connected with links 124 by means of pivot pins 125, said links 124 being in turn pivotally connected by means of the pivot pins 126 with the ears 127 provided on each side of the center line of the pusher block 37'. The bolt 121 is provided with a nut 128 under which is mounted a washer 129 so that the bolt can be loosened if desired and moved along the slot 120 to any desired position thereof. In this manner, the member 123 can be adjusted relative to the member 113 to any desired angular relationship thereto. Furthermore, by leaving the nut 128 loose, the member 123 can be moved by means of the handle 111 independently of any movement of the member 113 or the power driven mechanism. The member 113 is positively driven by means of the cams or eccentrics 50' and the movement of the member 113 due to the action of said cams or eccentrics will retract the blocks 37' or move them away from the fuel feeding opening of the furnace. Means for adjusting the stroke of the reciprocable member 37' is provided which comprises a screw-threaded member 130 which passes through a screw-threaded opening in the member 112 and engages with a stop lug 131 provided on the member 113, the member 130 being provided with a pivoted handle 132 for operating the same.

It will be clear from the description of the operation of the previously described form that normally the springs 116 will move the jaws in such position that the members 130 and 131 will be in engagement but that if any obstruction gets in the path of the block 37', the springs 116 will yield and allow the members 112 and 113 to separate so that the cams or eccentrics will operate without moving the block 37', or without interference of the block 37' therewith.

It will also be evident that by means of the adjusting bolt 121 operable in the slot 120, any desired position for the block 37' can be obtained, the adjustment by this means being finer than with the screw-threaded bolt-like member and notches or teeth in the other form of the invention previously described. The member 111 is detachable from the member 123 being removably mounted in a hollow boss 133 provided thereon.

It will be evident from the above, that in both forms of the invention pusher blocks are provided that may be adjusted independently of each other or may be operated by hand independently of each other or by power without interference of one block with the other pusher block and moreover that in either form, when the power driven means is disconnected from the pusher blocks by either loosening the bolt 121 or by withdrawing the member 85 from between the teeth 89, the pusher block 37 or 37' can be moved into a position adjoining the refractory block 33 to close both the opening 36 into the furnace and the opening 32 into the hopper, this being done when it is desired to bank the fires and preventing burning back of the fire into the hopper.

Having thus described my invention, what I desire to claim and secure by United States Letters Patent is:

1. A device of the character described comprising a pusher block, and means for reciprocating said pusher block yielding under undue strain comprising a rotatable shaft, an eccentric thereon, a forked lever engaging said eccentric and an adjustable connection between said pusher block and said lever, said forked lever comprising a pair of relatively movable jaws, receiving said eccentric therebetween and means yieldably connecting said jaws together.

2. A device of the character described comprising a plurality of pusher blocks, means whereby said blocks are reciprocable by hand, a power driven shaft, and means connecting said pusher blocks with said shaft to reciprocate said blocks, said means comprising yielding means permitting rotation of said shaft without actuation of said pusher blocks when said blocks strike an obstruction and a detachable connection between said yielding means and said blocks whereby said blocks are reciprocable either by hand or by power independently of each other.

3. A device of the character described comprising a furnace having a fuel hopper and a fuel inlet opening below said hopper, pusher blocks for pushing fuel from said hopper through said opening, a power driven shaft, and means connecting said pusher blocks with said shaft to reciprocate said blocks, said means including yielding means interposed between said shaft and each of said blocks for moving said blocks in fuel feeding direction, and non-yielding means connecting said shaft and blocks for retracting said blocks, said yielding means permitting operation of said shaft and the remaining blocks when one of said blocks is stuck in intermediate or retracted position though still connected to said shaft.

4. A device of the character described comprising a furnace having a fuel hopper and a fuel inlet opening below said hopper, pusher blocks for pushing fuel from said hopper through said opening, a power driven shaft, and means connecting said pusher blocks with said shaft to reciprocate said blocks, said means including yielding means interposed between said shaft and each of said blocks for moving said blocks in fuel feeding direction, and non-yielding means connecting said shaft and blocks for retracting said blocks, said yielding means permitting operation of said shaft and the remaining blocks when one of said blocks is stuck in intermediate or retracted position though still connected to said shaft, and a detachable connection between said blocks and shaft permitting independent operation of said blocks by hand or by power.

In witness whereof, I hereunto subscribe my name this 13th day of August, A. D. 1924.

GEORGE A. KOHOUT.